United States Patent
O'Gorman et al.

(10) Patent No.: US 8,140,286 B2
(45) Date of Patent: Mar. 20, 2012

(54) POSITION SENSING SYSTEM AND METHOD

(75) Inventors: Patrick O'Gorman, Grayslake, IL (US);
Dennis L. Stephens, Barrington, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 396 days.

(21) Appl. No.: 12/541,508

(22) Filed: Aug. 14, 2009

(65) Prior Publication Data
US 2011/0040513 A1    Feb. 17, 2011

(51) Int. Cl.
*G01C 17/38* (2006.01)
(52) U.S. Cl. ......................................... 702/94
(58) Field of Classification Search ............... 702/94
See application file for complete search history.

(56) References Cited

U.S. PATENT DOCUMENTS

| | | | |
|---|---|---|---|
| 5,210,490 A * | 5/1993 | Munch et al. ............ | 324/207.17 |
| 5,493,216 A | 2/1996 | Asa | |
| 5,955,881 A | 9/1999 | White et al. | |
| 6,883,394 B2 | 4/2005 | Koenig et al. | |
| 7,215,112 B1 | 5/2007 | Recio et al. | |
| 7,401,001 B2 * | 7/2008 | Stek et al. ................. | 702/150 |

* cited by examiner

*Primary Examiner* — Aditya Bhat

(57) ABSTRACT

The linear position of a moving mechanical component is determined. A plurality of values of a quantity using a plurality of sensors is sensed and the sensed values are indicative of the linear position of the mechanical component. The plurality of sensed values are converted into a plurality of best linear position estimates concerning the mechanical component. One or more compensations are applied to at least some of the plurality of best linear position estimates. Each of the compensations are applied to account for a relative positioning of one of the plurality of sensors with respect to the others. A plurality of weighting factors associated with each of the plurality of best linear position estimates are determined. The position of the mechanical component is determined using the plurality of best linear position estimates and the plurality of weighting factors.

19 Claims, 5 Drawing Sheets

POSITION SENSING SYSTEM AND METHOD

FIELD OF THE INVENTION

The field of the invention relates to sensing the movement of moving mechanical components such as those that are used in vehicular systems.

BACKGROUND

In many mechanical applications, it is useful to sense the position of moving parts. For example, in many vehicular transmission systems that include forks it is necessary to sense the linear position of the fork to determine when a synchro is engaged or when the fork is in the neutral position. In dual clutch applications, it is also important to know the position of the fork when the torque is high since a smooth shift quality is desired.

In previous systems, various attempts have been made to accurately sense and determine the position of moving mechanical components. For example, in one previous approach, two linear position sensors and curved permanent magnets have been used in order to determine the position of the mechanical component between magnets. A vertical component (perpendicular to a back iron) of flux is plotted against position as the sensor is moved horizontally. An ideal plot of flux density is formed. The flux density is almost linear within a certain range but outside that range the flux density is non-linear and is usually avoided in position determination calculations. Non-linearity of the plot is typically not desirable because it complicates the relationship between the position to be measured and the physical quantity indicative of this position—it typically requires the use of a look-up table that accounts for the non-linearity and provides the desired relationship between actual position and the position indication quantity. Furthermore, the sensitivity of the system is reduced in cases where the non-linearity results in a reduction in the measured quantity for a given movement, thereby reducing the accuracy of the measurement due to the normal presence of noise in the measurement system.

Unfortunately, in these previous systems the maximum movement that can be accurately sensed is limited, in part, because the sensors could only determine distances between the magnets. Consequently, the movement of the part may be itself effectively limited because the accurate position of the moving mechanical part cannot be determined or sensed beyond a certain range. Even if the movement of the part is not limited, it was difficult or impossible to accurately determine the position of the moving part. In any case, these problems have led to performance degradation in previous systems, for example, in transmission systems. Performance degradation has then led to other problems such as user frustration and dissatisfaction with these previous approaches.

Figure 1:
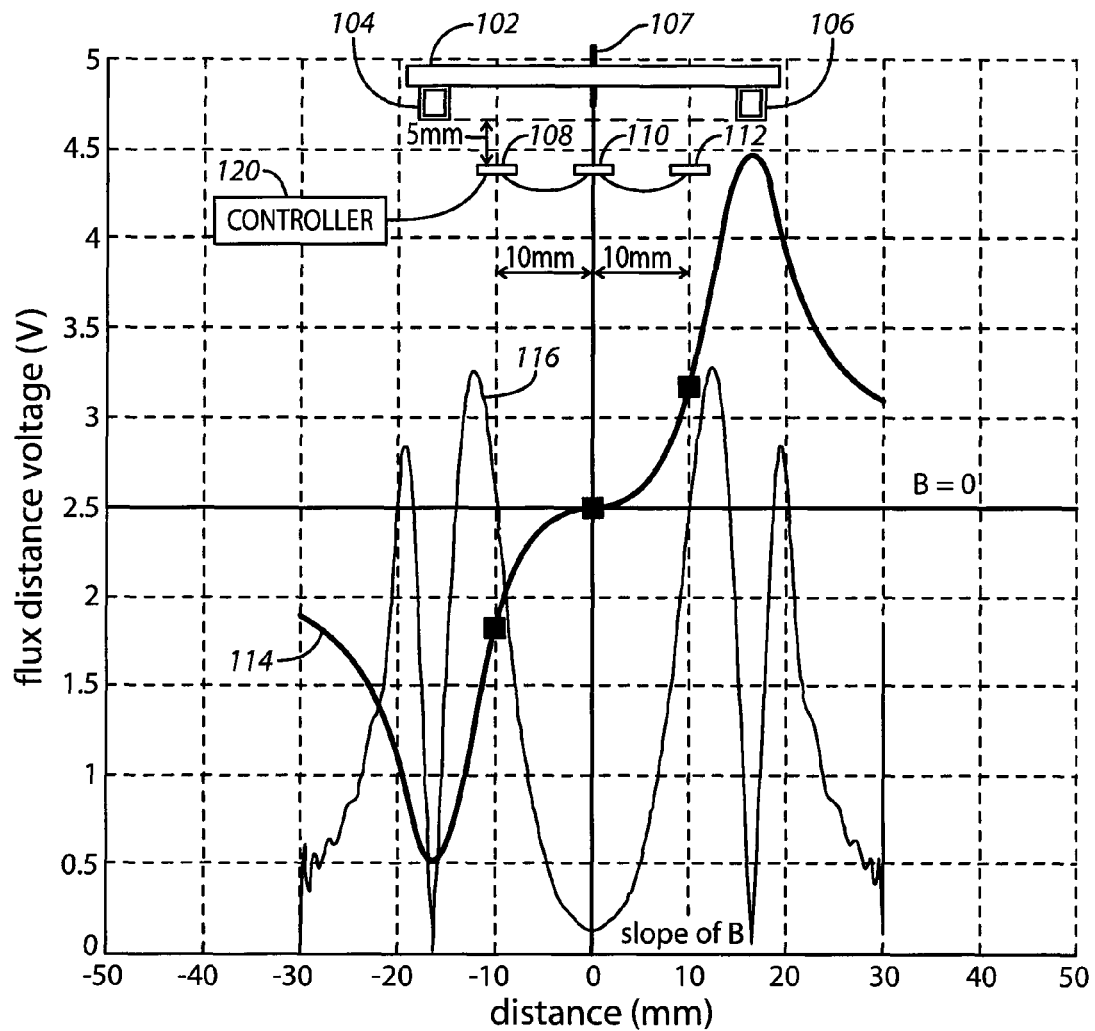
FIG. 1 comprises a diagram of a system for determining placement of an object according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where the position of a moving mechanical component is determined. The maximum movement that can be sensed is increased as compared to previous approaches and a more accurate determination of this movement is provided as compared to previous approaches. The present approaches can be implemented easily and in a cost effective manner.

In many of these embodiments, the linear position of a moving mechanical component is determined. A plurality of values of a quantity (e.g., a magnetic flux density that is represented by a voltage) is obtained using a plurality of sensors and the sensed values are indicative of the linear position of the mechanical component. The plurality of sensed values are converted into a plurality of best linear position estimates concerning the mechanical component. One or more compensations are applied to at least some of the plurality of best linear position estimates. Each of the compensations are applied to account for the relative positioning of one of the plurality of sensors with respect to the others. A plurality of weighting factors associated with each of the plurality of best linear position estimates are determined. The position of the mechanical component is then determined using the plurality of best linear position estimates and the plurality of weighting factors. The movement of the mechanical component may be at least partially controlled using the determined position.

The plurality of values of a quantity may be sensed from two or more sensors. Various quantities may be sensed such as magnetic flux voltages, light intensity values, and voltages to name a few examples.

Various data or programming structures can be utilized in the present approaches. For example, a look-up table may be used to obtain the best position estimate. The weighting factors may also be obtained from a look-up table.

The position of the mechanical component may include determining a weighted average of the best linear position estimates. The mechanical component may be any number of components such as a transmission system component and a braking system component. Other examples of moving mechanical components are possible.

In the examples described herein, the moving mechanical element is associated with a transmission system in a vehicle. For example, the moving element is a back iron/fork arrangement ("rack") where the rack moves and the position of the fork (at the center of the rack) is desired. However, it will be appreciated that the present approaches are applicable to all other types of moving mechanical components such as other systems in vehicles (e.g., braking systems) and in other fields such as printers to name a few examples. Also, the number of sensors shown in the present examples is shown to be three. However, it will be appreciated that any number of sensors greater than one can be used and that three sensors are shown as only one example. Additionally, it will be understood that the measurements, distances, dimensions, and table values described herein are examples only and can be adjusted to meet the needs of a particular user or system.

Referring now to FIG. 1, one example of a system for determining the position of a moving mechanical component is described. In this example, the location of sensors and magnets across an approximately 30 mm distance is shown. However, as mentioned it will be appreciated that this is one example distance and other examples are possible.

As shown in FIG. 1, the system includes a back iron 102, a first magnet 104, and a second magnet 106. At the center of the back iron 102 is a fork 107 and the position of this fork 107 is desired to be determined as the back iron/fork (the rack) moves. The purpose of the back iron is to provide a low reluctance path for the magnetic field. If the back iron 102 is not used, the strength of the magnets must be increased, thereby adding cost without any performance benefit. In this example, the back iron is planar in configuration.

A first sensor 108, a second sensor 110, and a third sensor 112 sense magnetic flux voltages created by the magnets 104 and 106 and convert this flux into a voltage. A processor 120 is coupled to the sensor and used to obtain the position estimate of the fork 107. Although three sensors are shown in this example, it will be appreciated that any number of sensors may be used. In this example, the sensors 108, 110, and 112 are located approximately 5 mm from the ends of the magnets 104 and 106.

The controller 120 may be any type of programmed computer such as a microprocessor, digital signal processor, programmable logic device, personal computer, or any combination digital/analog device that provides processing functions. The controller 120 may be located in the vehicle with the mechanical components and sensors, located at another location, or communicate with any other components (e.g., with the sensors 108, 110, and 112)) using any type of communication link (e.g., wired or wireless). Once the estimate is obtained, the controller 120 can use the position estimate to control movement of the mechanical element itself or control the operation of other elements to name two examples.

Also as shown in FIG. 1, a first graph 114 shows the predicted flux density as measured by the sensors 108, 110, and 112. A second graph 116 shows the slope of the first graph 114 at each point of the curve. The example of FIG. 1 shows a zero displacement of the fork 107 (from a center position along the vertical axis of the rack). In some of these approaches, the slope of the curve may be non-linear in nature. However, it will be appreciated that any problems associated with this non-linearity are advantageously overcome by the approaches described herein.

The magnets 104 and 106 are any suitable magnets or magnetic devices or coils through which a current flows to produce a magnetic field, and thereby a magnetic flux density. The magnets act to create a magnetic flux field that is measured by the sensors 108, 110, and 112. In the present examples, the magnets 104 and 106 are not sloped. However, other examples may be sloped or of some other configuration.

The sensors 108, 110, and 112 are any sensing arrangement or apparatus that are configured or are capable of sensing any type of electromagnetic radiation. It will be appreciated that a magnetoresistive element may also be used to detect magnetic flux. In this example, the sensors 108, 110, and 112 are Hall sensors configured to detect a voltage representing the flux density created by the magnets 104 and 106. The use of a third sensor adds redundancy to the present approaches. The plurality of values of a quantity may be sensed from two or more sensors. Various quantities may be sensed such as magnetic flux voltages, light intensity values, and voltages to name a few examples.

In one example of the operation of the system of FIG. 1, a plurality of values of a quantity (e.g., a magnetic flux density) are sensed using a plurality of sensors 108, 110 and 112 and the sensed values are indicative of the linear position of the back iron/fork apparatus. The plurality of sensed values are converted into a plurality of best linear position estimates concerning the position of the moving back iron/fork (rack) combination.

Once voltages are read from the sensors 108, 110, and 112 and a best estimate obtained, one or more compensations are applied to at least some of the plurality of best linear position estimates. Each of the compensations is applied to the position estimate to account for the relative positioning of one of the plurality of sensors with respect to the others. A look up table may be used for this purpose that indicates for a given sensor, a compensation amount to be applied to a particular sensor reading. For example, the sensor 108 may have a value of +10 applied as compensation; the sensor 110 may have a value of 0 applied as compensation; and the sensor 112 may have a value of −10 applied as compensation depending upon the sensor reading. The best estimate of position may be obtained from a look up table as well.

Figure 2:
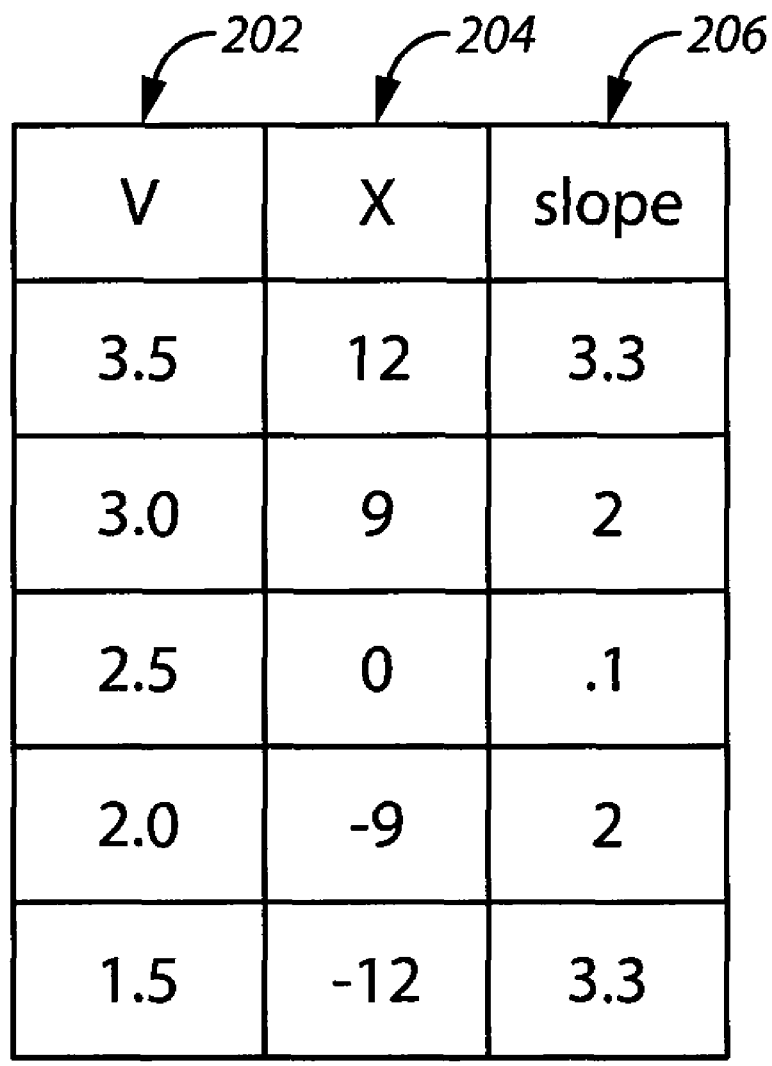
FIG. 2 comprises one example of a look up table according to various embodiments of the present invention.

A plurality of weighting (or sensitivity) factors associated with each of the plurality of best linear position estimates are then determined. For example, and now referring to FIG. 2, a weighting table 200 includes a voltage column 202, a distance column 204, and a slope column 206. The slope of the curve 114 (i.e., shown as the curve 116) is determined. In one example, the first sensor 108 reads a voltage of 2 and this corresponds to a slope of 2. The slopes are used as the weighting/sensitivity factors. The second sensor 110 reads a voltage of 2.5 and this corresponds to a slope of 0.1. The third sensor 112 reads a voltage of 3 and this corresponds to a slope of 2.

The use of weighting factors in the present approach reduces position error. More specifically, greater weighting is given to sensor measurements that are in the most sensitive regions (e.g., the region between approximately 6 mm and 15 mm and the region between approximately −6 mm to −15 mm). The most sensitive region(s) of the curve typically is the portion(s) of the curve where the slope is greatest, that is, where the output changes the most for a given change in the input.

In the present example, look up tables are used to determine certain values. However, it will be appreciated that the present approaches are not restricted to the use of look up tables and that any suitable data structure or algorithm may be used to determine or obtain the best position estimate, compensation value, or weighting value needed to determine the position of the moving mechanical part.

The position of the back iron/magnet combination is then determined using the plurality of best linear position estimates and the plurality of weighting factors. The movement of the back iron/fork (rack) may be at least partially controlled by the controller 120 using the determined position.

As shown in FIG. 1, the rack travels over a 30 mm distance and the sensors are spaced 10 mm apart. However, it will be appreciated that other distances and spacings may also be used. The example of FIG. 1 also shows the sensitivity function of the curve 114 (i.e., the B vs. x curve) and that close to the x=0 mm position, a change in position yields a relatively small change in B. The difference in sensitivity between maximum and minimum sensitivity is a factor of approximately 24 in the present example.

Figure 3:
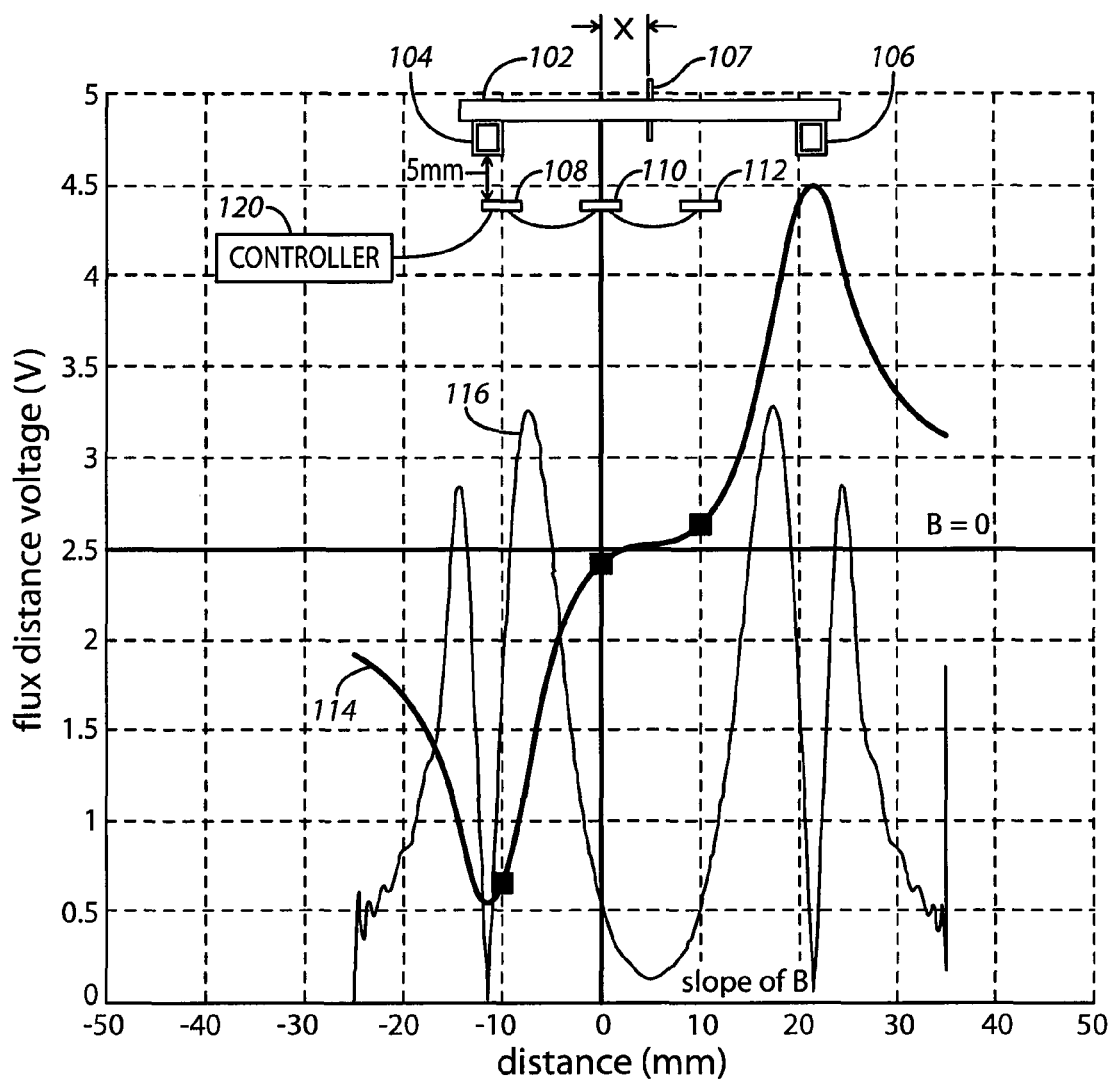
FIG. 3 comprises another diagram of the system of FIG. 1 with the moving mechanical part displaced from the position shown in FIG. 1 according to various embodiments of the present invention.

Referring now to FIG. 3, an example of the same system of FIG. 1 displaced a distance approximately 5 mm from the position of FIG. 1. In the example of FIG. 3, the fork has moved to the right by approximately 5 mm. The approaches described above with respect to FIG. 1 can be used to correct the readings, determine weighting factors and obtain a position estimate. In the example of FIG. 3, the sensitivity of the sensors has changed and the sensitivity (or weighting) factor for the sensor 108 (s1) is weighted the most (e.g., to 1.98), while the sensitivity factor for sensor 110 (s2) and the sensitivity factor for the sensor 112 (s3) are weighted the same (e.g., to 0.5). Generally speaking, the greater in magnitude the weight, the more important the value associated with the weight. For example, a weighting factor of 5 (and associated with a first sensor) is considered to be of greater significance that a weighting factor of 0.5 (and associated with a second sensor). Hence, in this example, the readings of the first sensor are deemed to be of greater importance than the readings of the second sensor in that region of operation.

Figure 4:
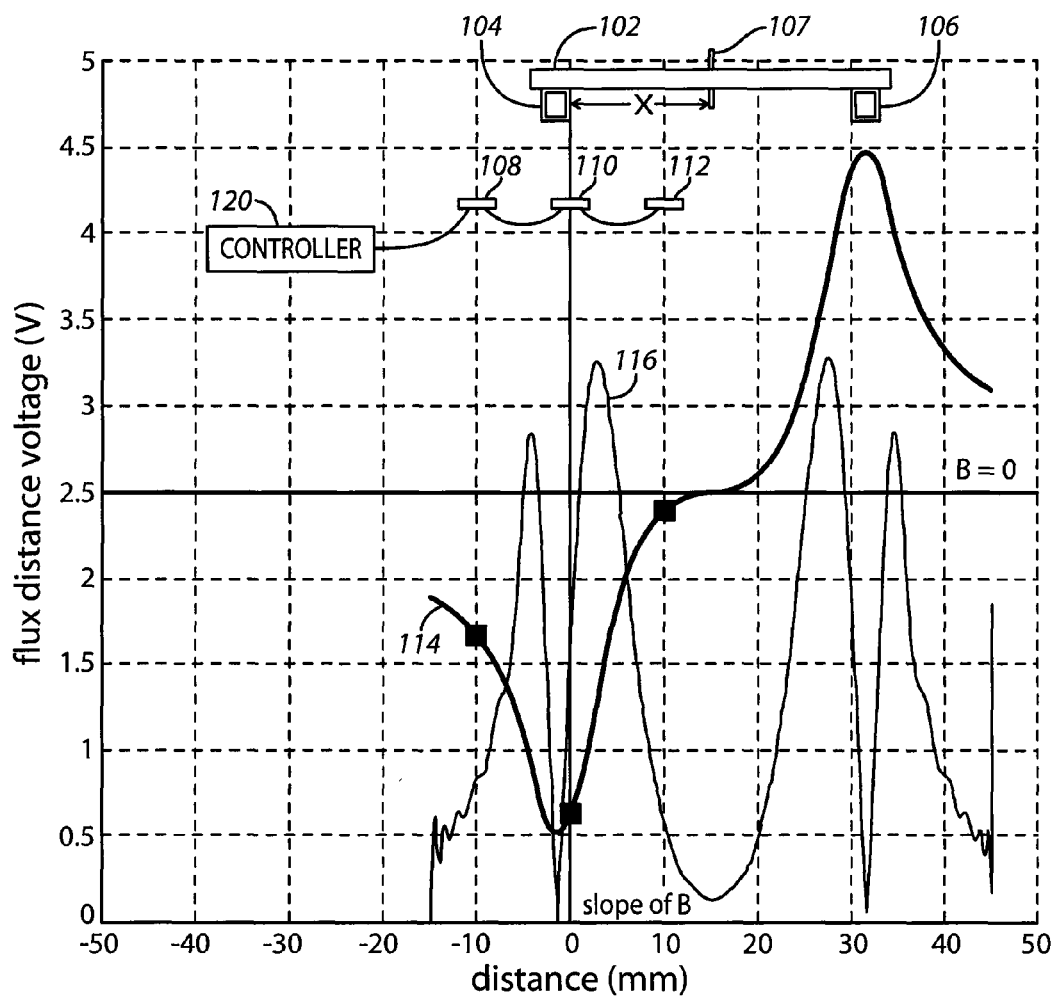
FIG. 4 comprises another diagram of the system of FIG. 1 and FIG. 2 with the moving mechanical part displaced from the position of FIG. 1 and FIG. 2 according to various embodiments of the present invention.

Referring now to FIG. 4, an example displacement of the same system of FIG. 1 is shown where the mechanical component (the back iron/magnet combination) is displaced a distance 15 mm from the position of FIG. 1 and 10 mm from the position of FIG. 3 and shows that the fork has moved to the right. The approaches described above with respect to FIG. 1 and FIG. 3 can be used to correct the readings, determine weighting factors and obtain a position estimate. In this example, when the fork moves more than 8 mm, one of the sensors enters the multi-valued portion of the B vs. x graph (i.e., the graph 114), as shown in FIG. 4.

Figure 5:
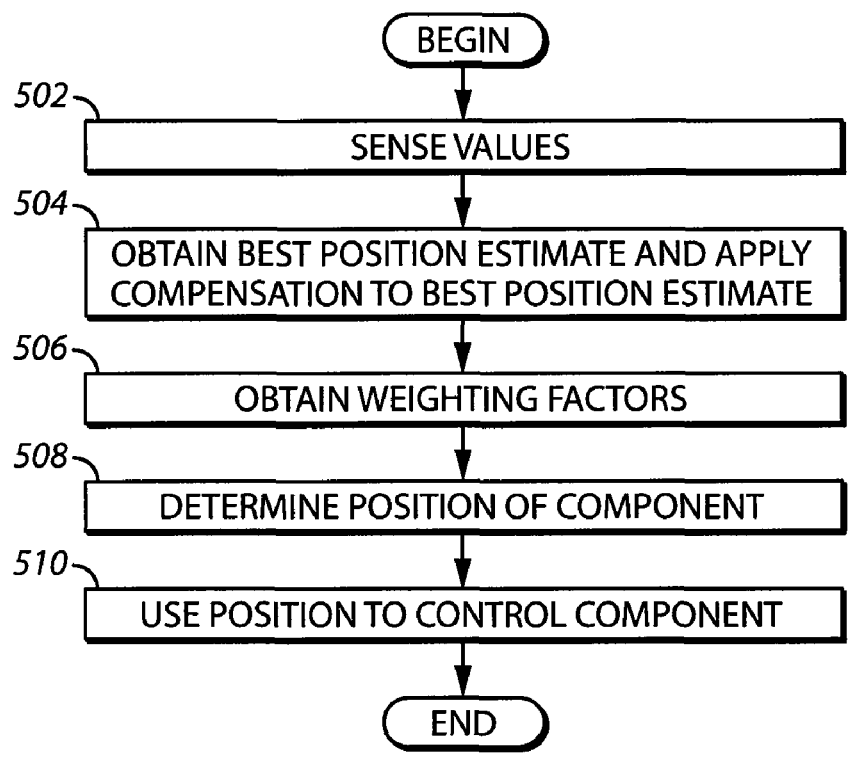
FIG. 5 comprises a flowchart showing an approach for determining a position of a moving mechanical part or component according to various embodiments of the present invention.

Referring now to FIG. 5, one example of an approach for obtaining a position estimate for a mechanical component is described. At step 502, a plurality of values of a quantity using a plurality of sensors is sensed and the sensed values are indicative of the linear position of the mechanical component. As described, various sensors can be used to sense a magnetic flux density.

At step 504, the plurality of sensed values obtained from the sensors are converted into a plurality of best linear position estimates concerning the mechanical component. One or more compensations are applied to at least some of the plurality of best linear position estimates. Each of these compensations are applied to the best position estimates to account for a relative positioning of one of the plurality of sensors with respect to the others. The compensation values are used to weight the position readings according to the sensitivity of the reading. If the sensor reading is not very sensitive in a region, then the output of the sensor in this region may not be a very accurate reading of position and, in one approach, is weighted accordingly.

At step 506, a plurality of weighting factors associated with each of the plurality of best linear position estimates are determined. In one example, a look up table can be used to determine a given weighting factor for a particular sensor.

In the present examples, the two magnets 104 and 106 produce a non-linear field. The weighting factors compensate for this non-linearity by weighting the measurement in the most sensitive area of the flux curve (e.g., the graph 114) to provide for increased sensitivity.

At step 508, the position of the mechanical component is determined using the plurality of best linear position estimates and the plurality of weighting factors. One example of an approach utilizes the following equation:

$$x = \frac{x_1 * s_1 + x_2 * s_2 + x_3 * s_3}{s_1 + s_2 + s_3}$$

In this equation, x1 is the estimate of rack center position (e.g., fork position) from the first sensor (e.g., the sensor 108), x2 is the estimate of rack center position from the second sensor (e.g., the sensor 110), x3 is the estimate of rack center position from the third sensor (e.g., the sensor 112), s1 is the slope (weighting factor) to be applied to the first sensor estimate, s2 is the slope (weighting factor) to be applied to the second sensor estimate, and s3 is the slope (weighting factor) to be applied to the third sensor estimate. The $x_1$, $x_2$, $x_3$ values are obtained after the corresponding sensor values $B_1$, $B_2$, $B_3$ (i.e., the sensor values are voltages that represent flux) are obtained from a look up table. The sensitivity/weighting values are determined beforehand from a finite element analysis and loaded into a second lookup table. Other equations or approaches may also be used to obtain the position estimates.

At step 510, the movement of the mechanical component may be at least partially controlled using the determined position. For example, the movement of the component may be halted, speeded, or slowed to name a few examples.

The flux density reading of each sensor is weighted according to its sensitivity (assuming all sensor readings are correct). In this example, the position x is obtained using the equation:

$$x = \frac{x_1 * s_1 + x_2 * s_2 + x_3 * s_3}{s_1 + s_2 + s_3}$$

As described above, in this equation, x1 is the estimate of rack center position from the first sensor (e.g., the sensor 108 in the present examples), x2 is the estimate of rack center position from the second sensor (e.g., the sensor 110 in the present examples), x3 is the estimate of rack center position from the third sensor (e.g., the sensor 112 in the present examples), s1 is the slope (weighting factor) to be applied to the first sensor estimate, s2 is the slope (weighting factor) to be applied to the second sensor estimate, and s3 is the slope (weighting factor) to be applied to the third sensor estimate. The $x_1$, $x_2$, $x_3$ values are obtained after the corresponding sensor voltage measurement values $B_1$, $B_2$, $B_3$ (representing flux density) are decoded from a first look up table. The values are determined beforehand from a finite element analysis or from a direct measurement of flux density versus position and loaded into a second lookup table. Alternatively, a single lookup table may be used.

The three sensors are read to obtain three voltage values (B1, B2, B3); 1 is the left sensor (e.g., the sensor 108), 2 is the center sensor (e.g., the sensor 110), 3 is the right sensor (e.g., the sensor 112)). For the voltage value B2, the x2 value is read from a look up table. In the neutral position (no displacement of the rack center or the fork), when B2 is 2.0 volts, then x2 is 0 mm. In this example, B2 is always single valued and x2 is read from the positive slope of the B vs. x curve (whose values are represented in the lookup table). If x2>5 mm, then sensor 3 (e.g., the sensor 112) is in the negative slope region of the curve and if x2<−5 mm, sensor 1 (e.g., the sensor 108) is in the negative slope region of the curve.

For sensor 1 (e.g., the sensor 108), a simple lookup of the B vs. x curve (e.g., from a look up table) cannot be used to obtain the x1 value because sensors 1 (e.g., the sensor 108) and 2 (e.g., the sensor 110) are separated by 10 mm. The value of position read directly from the lookup table is added to the 10 mm physical separation of the sensors and this value becomes x1, the estimate of fork center position from sensor 1 (e.g., the sensor 108).

For sensor 3 (e.g., the sensor 112), a lookup table is consulted to obtain an estimate and then −10 mm is added to the lookup table value as a compensation. The result is x3, the estimate of fork center position from sensor 3 (e.g., the sensor 112).

Then, a lookup table is used and the values for s1, s2 and s3 are determined. With all values know, x (the estimated position of the mechanical component, in this case a fork on the rack) is determined by:

$$x = \frac{x_1 * s_1 + x_2 * s_2 + x_3 * s_3}{s_1 + s_2 + s_3}$$

In one example indicative of a system with no inaccuracy in the measurements, when $B_1$ reads 1.8V, this value corresponds to x=0 for this sensor. For $B_2$, x=0 corresponds to 2.5V. For $B_3$, the value read is 3.2V. The location of the sensors (left, center, right) is known so the position of the centerline of the magnets (i.e., the position of the fork) can be determined from the three different sensors. The values of x shown in the example below have been corrected for the spatial position shift of the sensors.

Then, in this example, $$x = \frac{0.0 * 2.4 + 0.0 * 0.1 + 0.0 * 2.4}{2.4 + 0.1 + 2.4} = 0.0 \text{ mm}$$

That is, the estimated position of the center of the rack (the fork) is 0 mm.

In another example indicative of a system with measurement error, $x_1$=0.05, $x_2$=0.1 and $x_3$=0.02. Then, in this example, the weighting factors are determined to be $S_1$=2.4, $s_2$=0.1, $s_3$=2.4.

$$\text{Thus, } x = \frac{0.05 * 2.4 + 0.1 * 0.1 + 0.02 * 2.4}{2.4 + 0.1 + 2.4} = 0.037 \text{ mm}$$

That is, the estimated position of the center of the rack (the fork) in this second example is 0.037 mm.

In these approaches, the flux density reading is read by a processor and weighted by the sensitivity. The sensitivity/weighting values may be stored in the controller (e.g., at a memory at the controller 120) and may be used for all configurations. Using these approaches, the movement from approximately x=−15 mm to approximately 15 mm is a smooth function and the most sensitive sensor is weighted more heavily than other less sensitive sensors to obtain a more accurate measure of position than a system that uses all three sensors without the optimal weighting scheme described herein.

Figure 6:
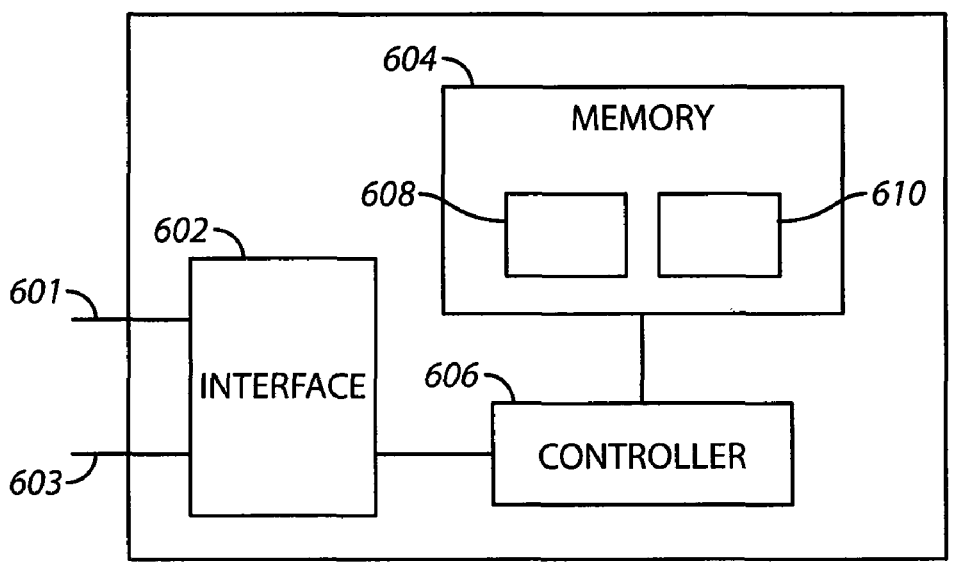
FIG. 6 is a block diagram of a system for determining position estimates of a moving mechanical part according to various embodiments of the present invention.

Referring now to FIG. 6, one example of a system for determining a position estimate for a moving mechanical component is described. The system includes an interface 602, a memory 604, and a controller 606.

The interface 602 has an input 601 and an output 603. The input receives sensed values of a quantity related to a linear position of the moving mechanical component (e.g., a voltage value) from sensors (not shown in FIG. 6). The memory 604 stores a plurality of weighting factors in a table 608.

The controller 606 is coupled to the interface 602 and the memory 604. The controller 606 is configured to convert the plurality of sensed values received at the input 601 of the interface 602 into a plurality of position estimates indicative of the linear position of the moving mechanical component. More specifically, the controller 606 is configured to apply one or more compensations to at least some of the plurality of best estimates of the linear position (e.g., using a table 610). Each of the compensations is applied to account for a relative positioning of the each of the plurality of sensors with respect to the others.

The controller 606 is further configured to select and obtain a plurality of weighting factors from the table 608 in the memory 604. The selected weighting factors are associated with the plurality of best linear position estimates. The controller 606 is further configured to determine the linear position of a mechanical component (not shown in FIG. 6) using the plurality of best estimates and the plurality of weighting factors.

The determined position of the mechanical component may be used by the controller 606 to control the mechanical component itself (e.g., by sending a control signal to the component via the output 603 of the interface 602). The controller 606 may also control other components (e.g., by sending a control signal to the component via the output 603 to these components).

Factory calibration can be used in the present approaches to eliminate offsets due to magnet strength variation and sensor sensitivity variation. One of the sources of measurement inaccuracy is an offset in the sensor reading that is typically present during the life of a sensor. If the reading of the sensor output is taken when there is no magnetic field present, it is expected that the sensor will indicate a zero magnetic field. If the reading does not indicate a zero magnetic field, then the value that is read is an offset and will be present in all subsequent values, irregardless of the presence of the magnetic field. It is advantageous to subtract this offset value from all subsequent readings so the accuracy of the sensor alone is improved. The results of this calibration can be added to be above sensitivity values to obtain a composite weight, thereby improving system accuracy.

Thus, improved accuracy in position determination is obtained using multiple (e.g., three) sensors to obtain measurements. The approaches of weighting each sensor value according to its sensitivity described herein result in a smooth position value determination over the complete travel range of a moving mechanical component. Manufacturing variations in parts can be eliminated in a systematic way.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention. Further, those skilled in the art will recognize that the approaches described herein may also be used in systems that uses differences in position to determine velocity or speed, among other quantities.

What is claimed is:

1. A method of determining the linear position of a moving mechanical component, the method comprising:
sensing a plurality of values of a quantity using a plurality of sensors, the sensed values indicative of the linear position of the mechanical component;
converting the plurality of sensed values into a plurality of best linear position estimates concerning the mechanical component;
applying one or more compensations to at least some of the plurality of best linear position estimates, each of the compensations being applied to account for a relative positioning of one of the plurality of sensors with respect to the others;
determining a plurality of weighting factors associated with each of the plurality of best linear position estimates;
determining the position of the mechanical component using the plurality of best linear position estimates and the plurality of weighting factors.

2. The method of claim 1 further comprising at least partially controlling a movement of the mechanical component using the determined position.

3. The method of claim 1 wherein sensing a plurality of values of a quantity comprises sensing a plurality of values from two or more sensors.

4. The method of claim 1 wherein the quantity comprises a quantity selected from the group consisting of a voltage representing a magnetic flux voltage and a light intensity value.

5. The method of claim 1 wherein the converting comprises obtaining the best linear position estimates at least in part by using a look-up table.

6. The method of claim 1 wherein determining a plurality of weighting factors comprises obtaining the weighting factors from a look-up table.

7. The method of claim 1 wherein determining the position of the mechanical component comprises determining a weighted average of the best linear position estimates.

8. The method of claim 1 wherein the mechanical component is a component selected from the group consisting of a transmission system component and a braking system component.

9. An apparatus for determining the linear position of a moving mechanical component, the apparatus comprising:
an interface having an input and an output, the input receiving sensed values of a quantity related to a linear position of the moving mechanical component;
a memory that stores a plurality of weighting factors;
a controller coupled to the interface and the memory, the controller configured to convert the plurality of sensed values received at the input of the interface into a plurality of position estimates indicative of the linear position of the moving mechanical component, the controller being further configured to apply one or more compensations to at least some of the plurality of best estimates of the linear position, each of the compensations being applied to account for a relative positioning of the each of the plurality of sensors with respect to the others, the controller being further configured to select and obtain a plurality of weighting factors from the memory, the selected weighting factors associated with the plurality of best linear position estimates, the controller being further configured to determine the linear position of the mechanical component using the plurality of best estimates and the plurality of weighting factors.

10. The apparatus of claim 9 wherein the controller is configured to determine the linear position and make the linear position available at the output of the interface.

11. The apparatus of claim 9 wherein the controller is further configured to determine a control signal that at least partially controls a movement of the mechanical component, the control signal being determined at least in part by using the determined linear position.

12. The apparatus of claim 9 wherein the plurality of sensors comprises two or more sensors.

13. The apparatus of claim 9 wherein the quantity comprises a quantity selected from the group consisting of a voltage representing a magnetic flux voltage and a light intensity value.

14. The apparatus of claim 9 wherein the controller is configured to obtain the best linear position estimates at least in part by using stored values in the look-up table.

15. The apparatus of claim 9 wherein the linear position of the mechanical component is determined by a weighted average.

16. The apparatus of claim 9 wherein the mechanical component is a component selected from the group consisting of a transmission system component and a braking system component.

17. The apparatus of claim 9 wherein the weighting factors are associated with a slope of a magnetic response curve.

18. The apparatus of claim 9 wherein the weighting factors are selecting from a group consisting of zero and non-zero values.

19. The apparatus of claim 9 wherein the compensations are zero or non-zero values.

* * * * *